United States Patent
Mochizuki

[11] Patent Number: 5,808,600
[45] Date of Patent: Sep. 15, 1998

[54] CHARACTER PATTERN FORMING METHOD AND APPARATUS

[75] Inventor: Yasushi Mochizuki, Yokohama, Japan

[73] Assignee: Canon Kabushiki Kaisha, Tokyo, Japan

[21] Appl. No.: 867,666

[22] Filed: Jun. 2, 1997

Related U.S. Application Data

[63] Continuation of Ser. No. 485,036, Jun. 7, 1995, abandoned, which is a continuation of Ser. No. 93,940, Jul. 21, 1993, abandoned.

[30] Foreign Application Priority Data

Jul. 29, 1992 [JP] Japan .................................. 4-202541

[51] Int. Cl.$^6$ ...................................................... G09G 5/22
[52] U.S. Cl. ........................... 345/141; 345/470; 345/192
[58] Field of Search .................................... 345/141, 142, 345/143, 144, 128, 192, 194, 195, 467, 468, 469, 470, 471, 472

[56] References Cited

U.S. PATENT DOCUMENTS

| | | | |
|---|---|---|---|
| 4,754,270 | 6/1988 | Murauchi | 345/127 |
| 4,843,593 | 6/1989 | Yanaru et al. | 345/143 |
| 4,897,638 | 1/1990 | Kokunishi et al. | 345/142 |
| 4,962,465 | 10/1990 | Saito et al. | 345/143 |
| 5,086,481 | 2/1992 | Yoshida et al. | 345/144 |
| 5,107,259 | 4/1992 | Weitzen et al. | 345/143 |

*Primary Examiner*—Xiao Wu
*Attorney, Agent, or Firm*—Fitzpatrick, Cella, Harper & Scinto

[57] ABSTRACT

Character forming method and apparatus are provided. Font data is stored. The conditions to develop the stored font data are stored. An area to develop the font data is reserved in a memory in accordance with the stored conditions. The font data is developed in the area reserved. The font data is vector information. The condition to develop the font data is that the data is either one of the outline data, shadow data, and filler data. The bit map patterns of filler pattern, outline pattern, and shadow pattern are formed in accordance with the developed font data and are individually stored.

34 Claims, 9 Drawing Sheets

FILLER PATTERN   OUTLINE PATTERN   SHADOW PATTERN and is a
CHARACTER PATTERN FORMING METHOD AND APPARATUS This application is a continuation of application Ser. No. 08/485,036 filed Jun. 7, 1995, now abandoned, which is a continuation of application Ser. No. 08/093,940 filed Jul. 21, 1993, now abandoned.

BACKGROUND OF THE INVENTION

1. Field of the Invention

The present invention relates to character pattern forming method and apparatus for generating a character pattern of a desired color or a designated hatching pattern from a color hatching pattern or a plurality of kinds of hatching patterns.

2. Related Background Art

A conventional method of forming a modified character such as outline, shadow, and the like for a bit map font which is obtained by developing a dot font or a scalable font will now be described with reference to FIG. 8. First, a pattern of an original character is repeatedly copied while shifting such a pattern by a distance corresponding to a thickness of an outline. The pattern which was shifted by the width of the outline is repeatedly copied while shifting such a shifted pattern in the direction of a shadow by a distance corresponding to a length of shadow, thereby forming an OR pattern portion (81) in which the original character was thickened by the amount corresponding to the width of outline and the length of shadow.

By subsequently reversing the original character pattern, an AND pattern portion (82) is formed. By getting the AND of the AND pattern portion (82) and the OR pattern portion (81), a pattern of a modified character (83) is formed.

In the above conventional method, however, all of the modified character such as outline and shadow are formed as patterns by the OR portion and AND portion as shown in FIG. 8, the color or hatching pattern of each of the outline portion and shadow portion cannot be designated or a filler portion cannot be designated by a different color.

SUMMARY OF THE INVENTION

According to the invention, necessary pattern portions (filler pattern portion, outline pattern portion, shadow pattern portion) are formed in accordance with a character modification designated in a character pattern to be formed and each pattern portion can be generated by a desired color and a desired hatching pattern.

According to the invention, necessary pattern memories are assured in accordance with a character modification designated in a pattern to be formed and a pattern is formed in each memory, thereby enabling a using efficiency of the memory to be raised.

DETAILED DESCRIPTION OF THE PREFERRED EMBODIMENTS

An embodiment of the present invention will be described in detail hereinbelow with reference to the drawings.

Figure 1:
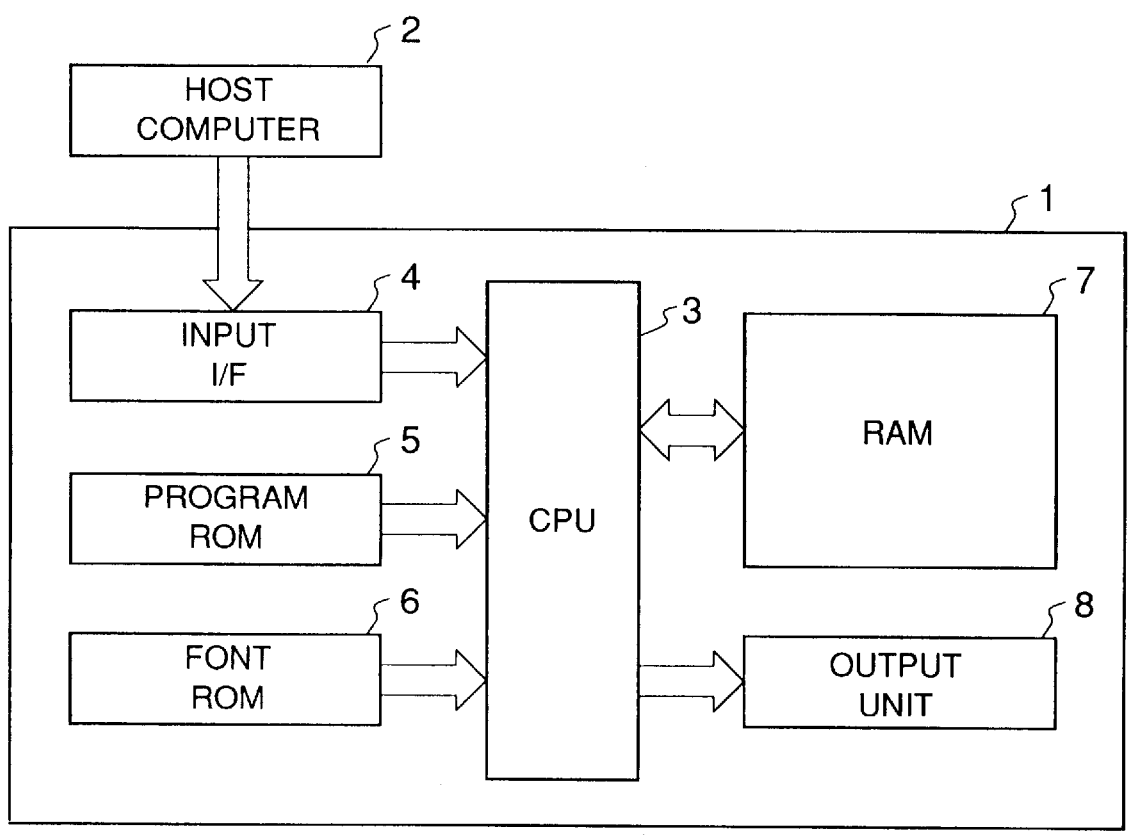
FIG. 1 is a diagram showing a whole construction of a printing apparatus according to an embodiment of the invention.

FIG. 1 is a block diagram for explaining a construction of a printing apparatus according to an embodiment. Reference numeral 1 denotes a printer main body; 2 a host computer serving as a data supply source; 3 a CPU to control the component elements in the printer main body 1 in accordance with a program stored in a program ROM 5; 4 an input interface to store data which is sent from the host computer 2; 5 the program ROM in which control programs including programs of flowcharts, which will be explained hereinlater, have been stored; 6 a font ROM in which scalable fonts (characters stored by being expressed by stroke information instead of dot signals) corresponding to input character codes have been stored; 7 a built-in RAM as a memory medium including a developing memory of a modified character; and 8 an output unit to print.

Figure 2:
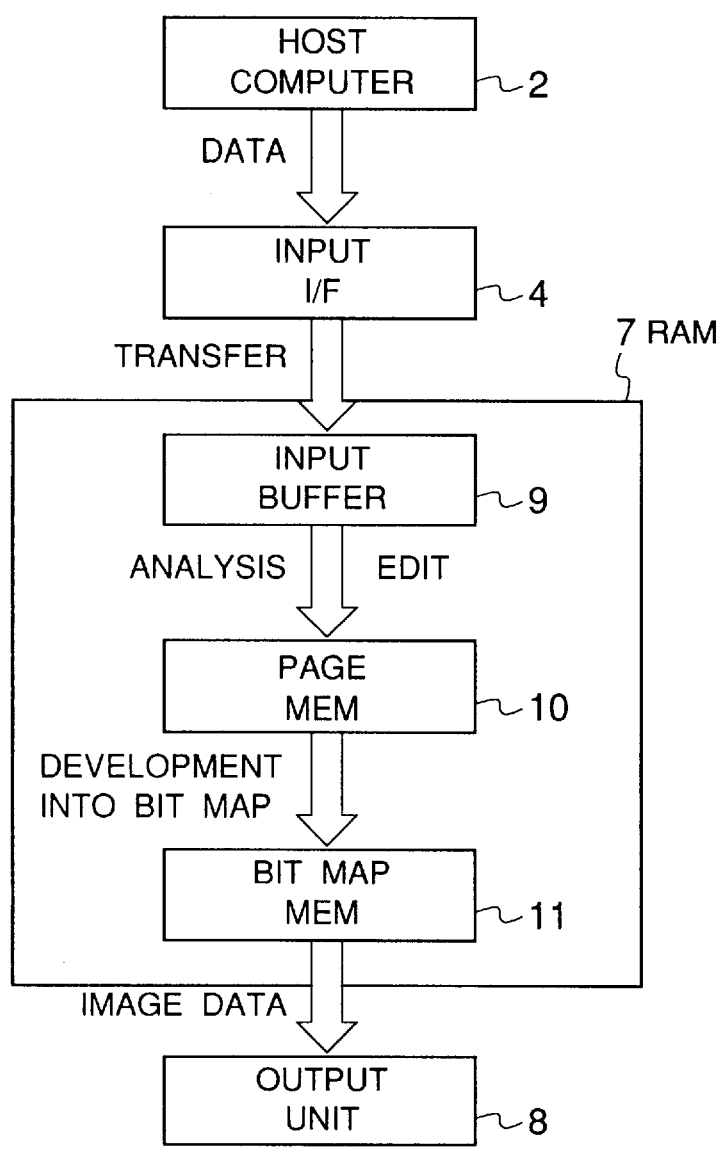
FIG. 2 shows a flow of data in the printing apparatus.

FIG. 2 shows a flow of data in the printer.

When the input interface 4 receives data from the host computer 2, the input interface 4 transfers the data to an input buffer 9 provided in the built-in RAM 7.

Figure 3A:
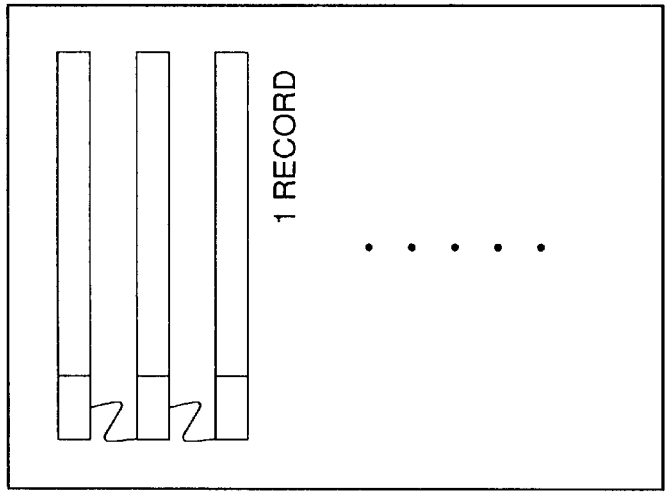
FIG. 3A is a constructional diagram in a page memory.
Figure 3B:
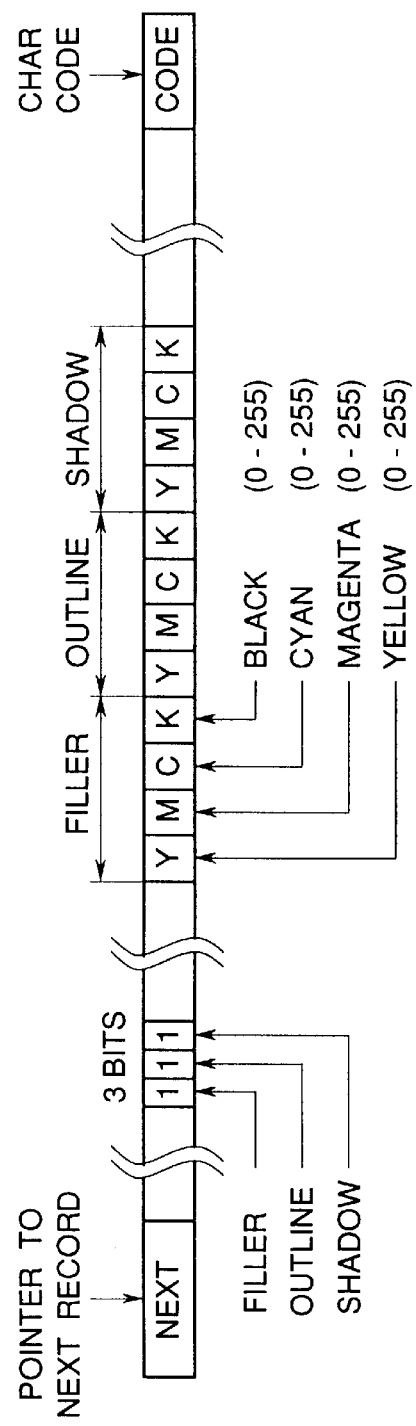
FIG. 3B is a diagram showing a data structure of each record in the page memory of FIG. 3A.

The transferred data is analyzed by the CPU 3 and is edited into a record format every page in a page memory 10 as an individual command as shown in FIGS. 3A and 3B.

The edited record is subsequently analyzed by a drawing routine and is developed as a bit map image in a bit map memory 11. With respect to a character, a bit map forming routine for character processing is called in this instance. The present invention relates to such a bit map forming routine and will be explained in detail with reference to a flowchart of FIG. 4.

The bit map image formed by the drawing routine is transferred to the output unit of the printer main body and is printed.

FIG. 3A shows the page memory 10 in FIG. 2. The records of one page have been edited in the page memory. FIG. 3B further shows a detailed data structure of the record. A pointer to the next record is stored in the record and is linked. One record shown in FIG. 3B relates to a record regarding a character.

The record includes bit flags indicative of the presence or absence of a FILLER PATTERN, an OUTLINE PATTERN, and a SHADOW PATTERN. When a character is not modified, all of those three bits are set to 0. When there is a modification of a character, the flag of the modified pattern is set to 1.

With respect to the patterns whose flags are set to 1, information of the color is given to each pattern. FIG. 3B shows an example in the case where all of three bits are set to 1. The color information of each pattern is shown by 256 gradations using the values of 0 to 255. As the numeral is large, a ratio of the color increases. For example, in the case where the color of the filler pattern is designated to yellow, the values of Y=255, M=0, C=0, and K=0 are stored as color information in the filler pattern portion.

Although not shown in FIG. 3B, as information of a character, information such as character size, character pitch, filler pattern number, thickness of outline, shadow pattern number, direction of shadow, length of shadow, and the like is further described.

Figure 4:
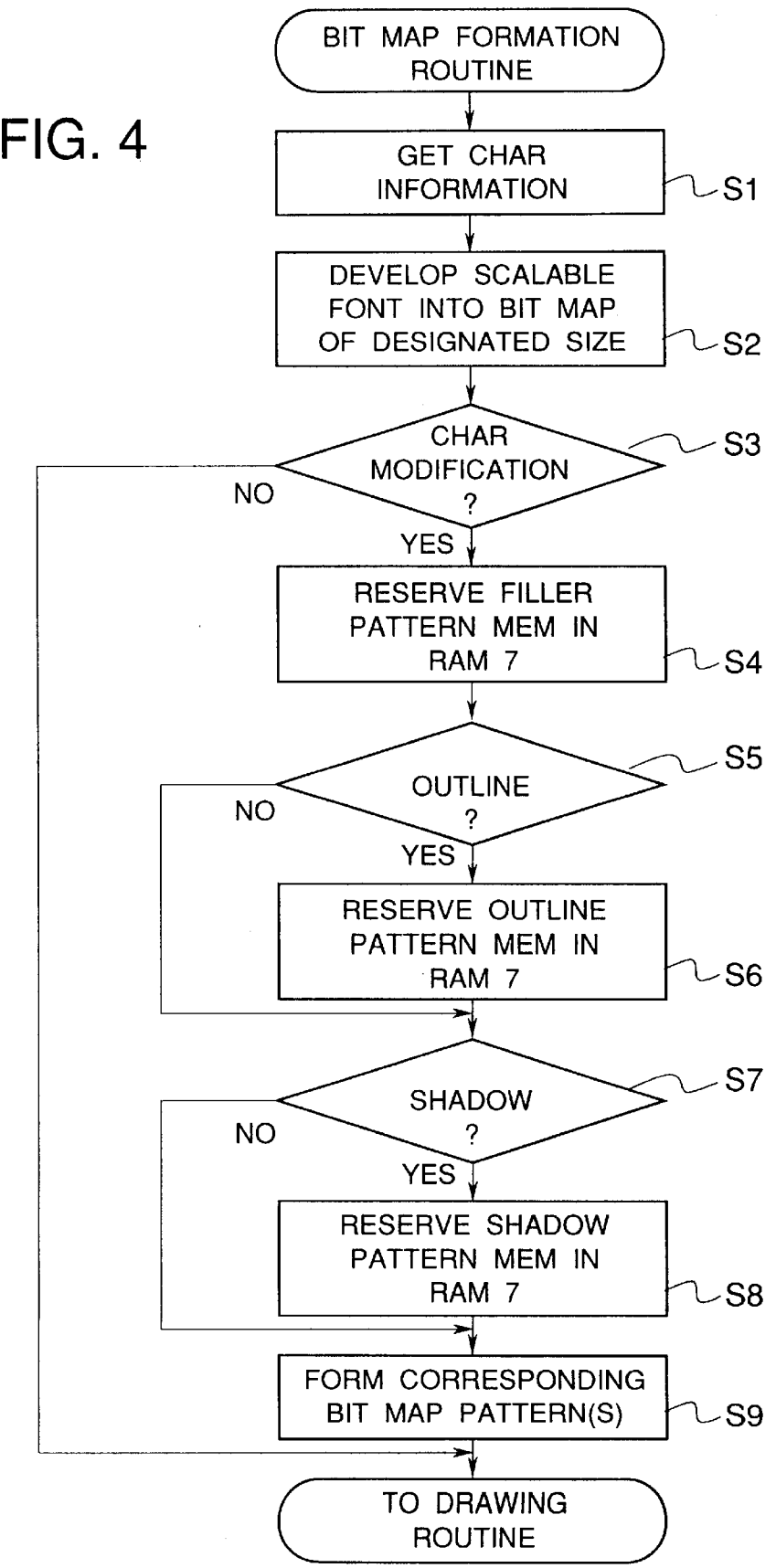
FIG. 4 is a flowchart for explaining a modified character processing procedure stored in a program ROM.

FIG. 4 is a flowchart for explaining a character modification processing procedure stored in the program ROM 5. The above procedure will now be described hereinbelow with reference to the flowchart.

As described in FIG. 2, a bit map forming routine of a character is accessed from the drawing routine with regard to the character on the basis of the record information in the page memory.

First, in step S1, the character information described in the record is obtained.

In step S2, on the basis of the character information such as character code, character size, character pitch, and the like obtained in step S1, the scalable font stored in the font ROM 6 is developed to the font of the designated size, thereby forming a bit map in the built-in RAM 7.

In step S3, whether there is a character modification or not is judged on the basis of the character information obtained from the record in step S1. If YES, a filler pattern memory is reserved in the RAM 7 in step S4. In this instance, the memory size of the filler portion is calculated on the basis of the character information obtained and is reserved.

When there is no character modification, the processing routine is directly returned to the drawing routine as an editing routine of the bit map.

In step S5, whether there is an outline modification or not is judged on the basis of the character information obtained from the record in step S1. If YES, an outline pattern memory is reserved in the RAM 7 in step S6. In this instance, as a memory size which is held in the RAM 7, the size of the outline portion is calculated on the basis of the character information obtained and is reserved.

When there is no outline modification, no outline pattern memory is reserved.

Similarly, in step S7, whether there is a shadow modification or not is judged on the basis of the character information obtained from the record in step S1. If YES, a shadow pattern memory is reserved in the RAM 7 in step S8. In this instance, as a memory size which is reserved in the RAM 7, the size of the shadow portion is calculated on the basis of the character information obtained and is reserved.

When there is no shadow modification, no shadow pattern memory is reserved.

As mentioned above, the filler pattern memory is first reserved in the RAM 7. Subsequently, the outline pattern memory and the shadow pattern memory are reserved in the RAM 7 as necessary.

The filler pattern memory, outline pattern memory, and shadow pattern memory are reserved in a font cache memory in the RAM 7 in the case where the font cache function exists in its character output apparatus.

In step S9, bit maps of the filler pattern memory, outline pattern memory, and shadow pattern memory are formed on the memories held and the processing routine advances to the drawing routine.

Figure 5:
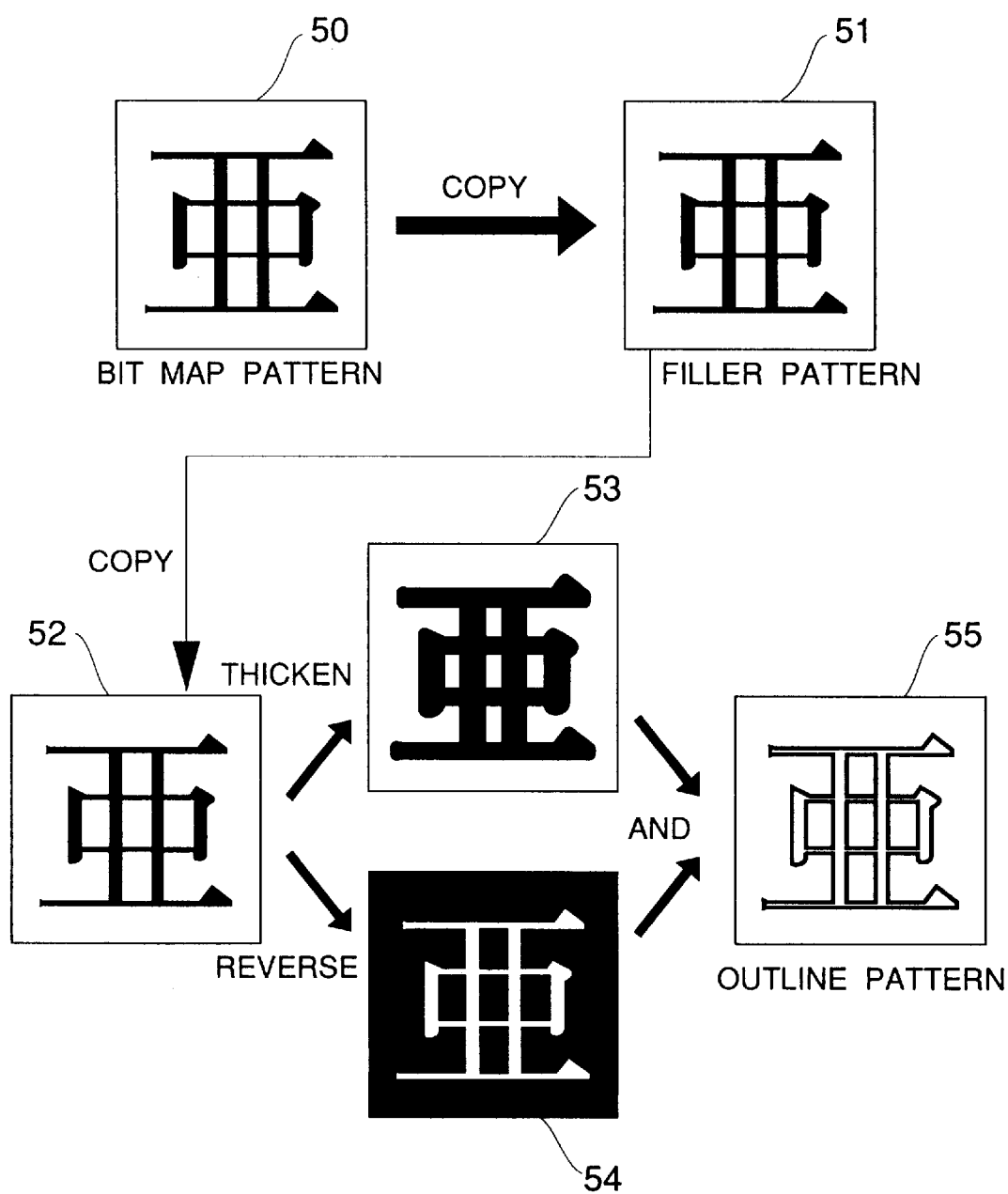
FIG. 5 is a diagram showing a method of forming a filler pattern and an outline pattern.

FIG. 5 shows a forming method of a filler bit map pattern and an outline bit map pattern.

A bit map pattern 50 obtained by developing the scalable font in step S2 is copied into the filler pattern memory, thereby forming a filler pattern 51.

As for an outline pattern 55, the filler pattern 51 is first copied into the outline pattern memory (52) and is copied and thickened (53) while shifting the pattern by an amount that is twice as large as the thickness of outline on the basis of the character information obtained in step S1.

Subsequently, while the bit of the filler pattern is reversed (54), the AND with the outline pattern is calculated, so that the outline pattern 55 can be formed.

Figure 6A:
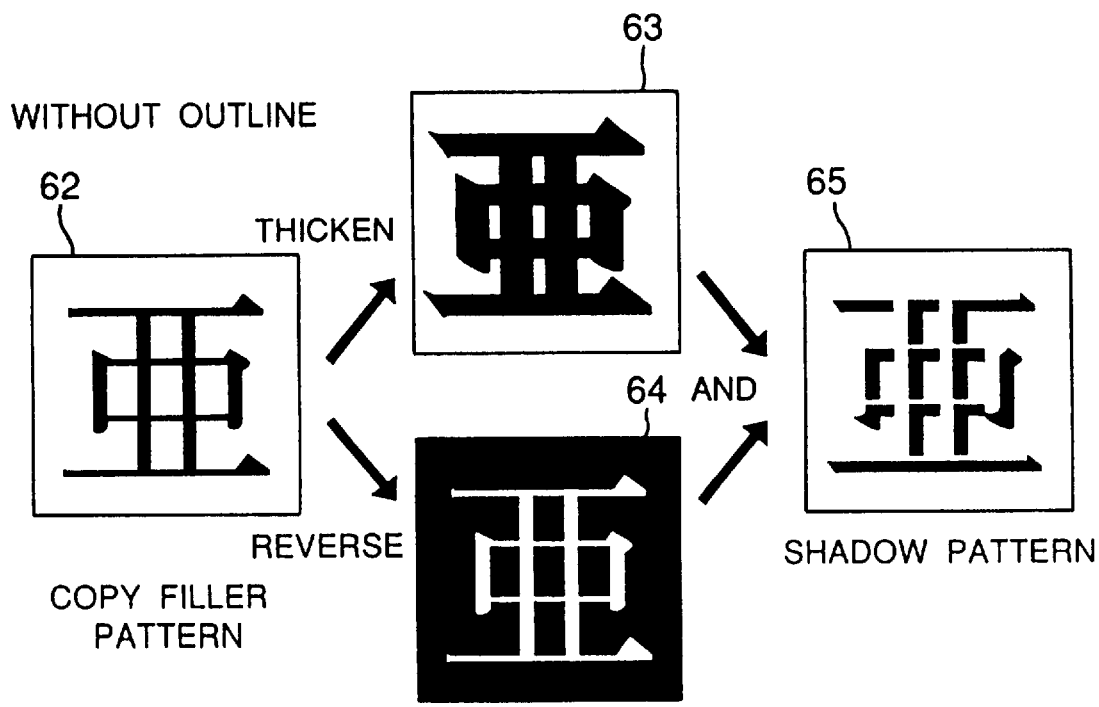
FIG. 6 is a diagram showing a method of forming a shadow pattern.
Figure 6B:
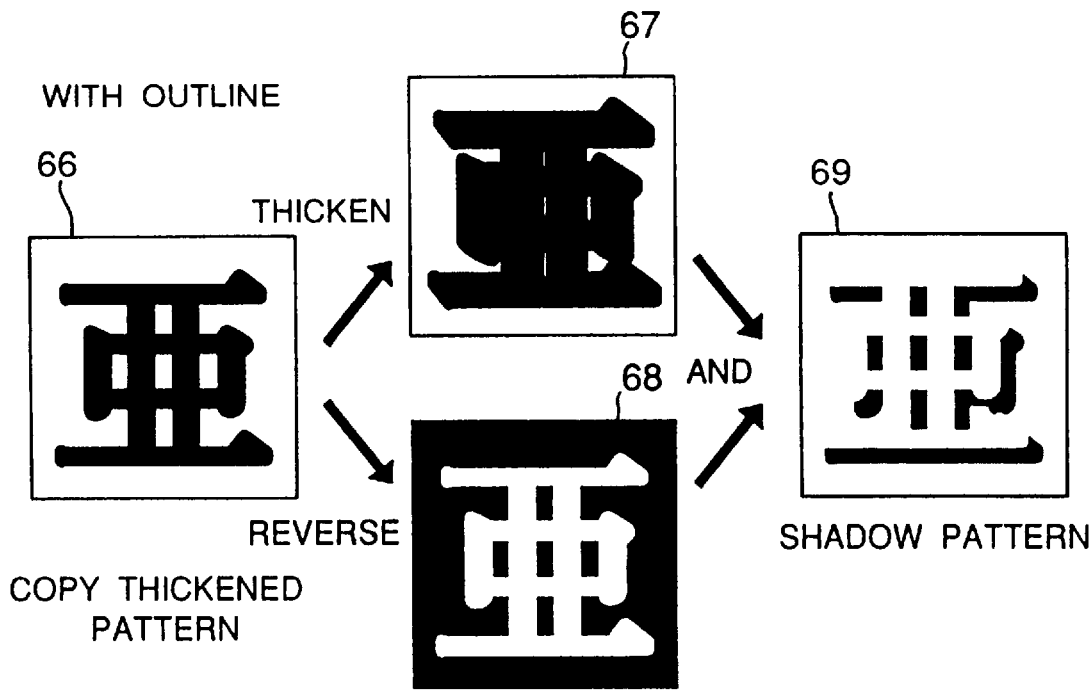

FIG. 6 shows a forming method of the shadow pattern.

As for the shadow pattern, in case of no outline (65), the filler pattern is first copied into the shadow pattern memory (62) and is copied and thickened (63) while shifting the pattern in the shadow direction by an amount corresponding to the length of shadow on the basis of the character information obtained in step S1.

Subsequently, while the bit of the filler pattern is reversed (64), the AND with the shadow pattern is calculated, so that a shadow pattern 65 can be formed.

When there is an outline, the shadow pattern is formed in parallel with the outline pattern. First, when the pattern which has been thickened by an amount of the thickness of outline is formed in the outline pattern memory, the pattern is copied into the shadow pattern memory (66).

The pattern is subsequently copied and thickened (67) while shifting the pattern in the shadow direction by an amount of the length of shadow on the basis of the character information obtained in step S1.

Before the outline pattern is formed, while the bit of the thickened outline pattern is reversed (68), the AND with the shadow pattern is calculated, so that a shadow pattern 69 can be formed.

In this manner as mentioned above, the bit maps of the filler pattern (51), outline pattern (55), and shadow patterns (65, 69) can be formed.

Figure 9:
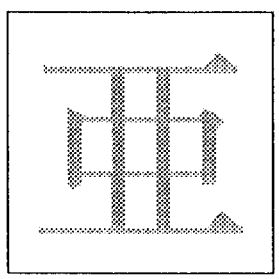
FIG. 9 is a diagram showing a method of forming a modified character according to the invention.
Figure 9:
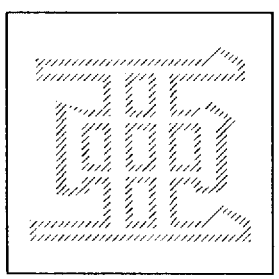
Figure 9:
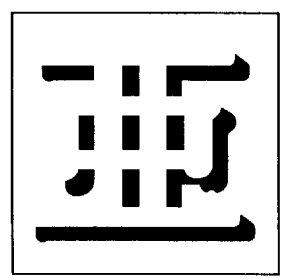
Figure 9:
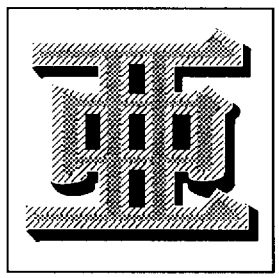

Different colors can be individually designated or different pattern filler processings can be individually executed for the filler pattern, outline pattern, and shadow pattern by the drawing routine, so that a number of various kinds of modified characters which cannot be realized hitherto can be generated as shown in FIG. 9.

Figure 7:
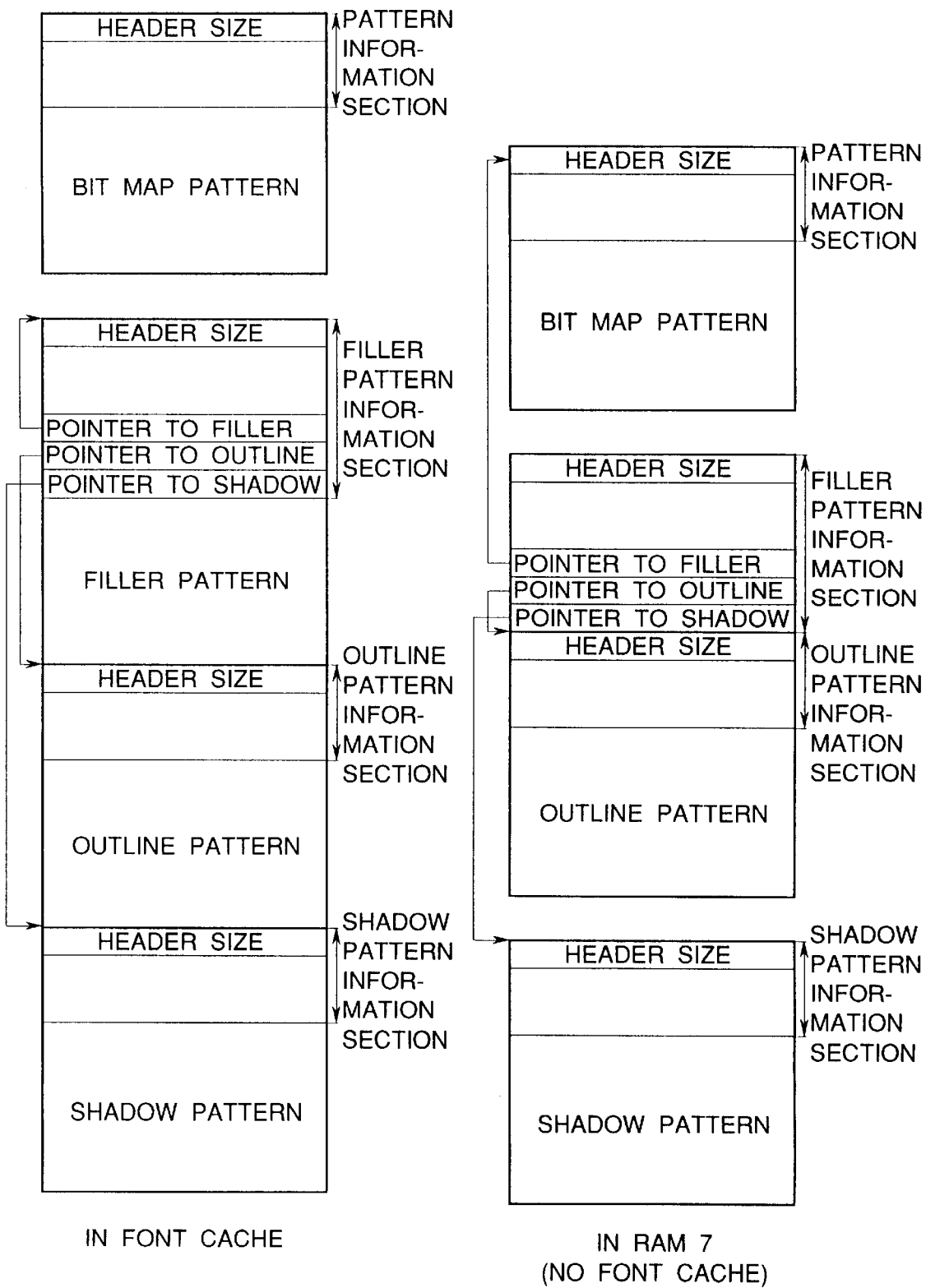
FIG. 7 is a diagram showing a difference of the memory structures due to the presence or absence of a font cache.
Figure 8:
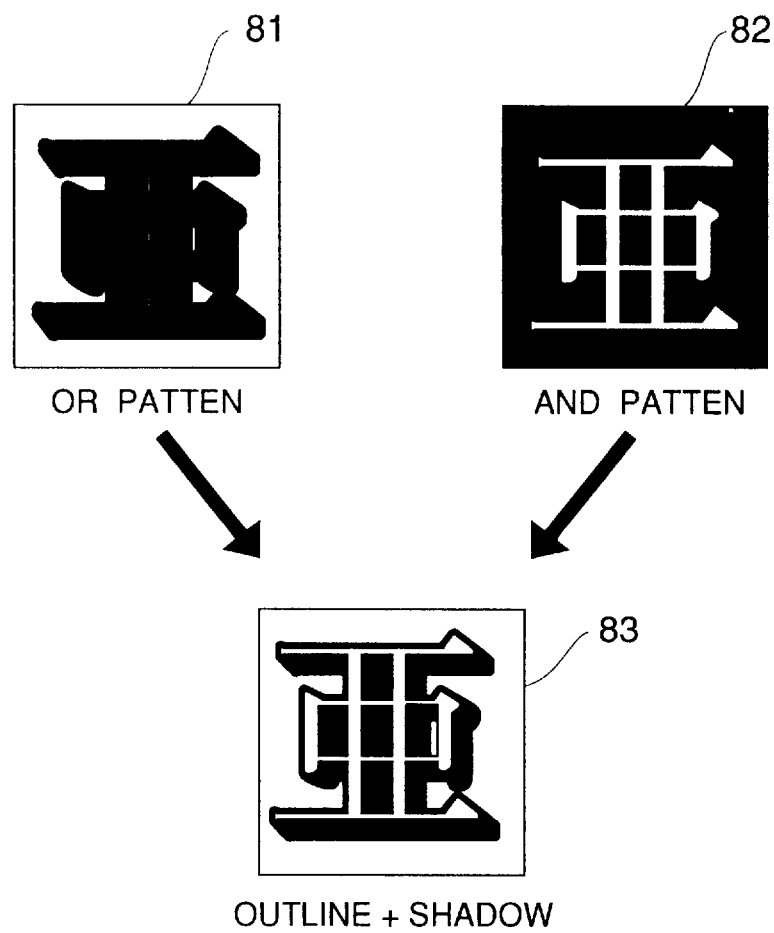
FIG. 8 is a diagram showing a conventional method of forming a modified character.

FIG. 7 shows structures of a bit map pattern memory (to store the bit map pattern which is obtained by developing the scalable font), a filler pattern memory, an outline pattern memory, and a shadow pattern memory in both cases where there is a font cache and there is no font cache.

In the character output apparatus having the font cache, in the case where there is a font cache, a font cache memory is reserved in the RAM 7.

The bit map pattern memory, filler pattern memory, outline pattern memory, and shadow pattern memory are reserved in the font cache memory. In this instance, the memories for the modified character patterns are simultaneously reserved. The filler pattern information portion has a pointer to the filler pattern information portion, a pointer to the outline pattern information portion, and a pointer to the shadow pattern information portion and they are linked.

In the case, however, where there is no surplus capacity in the RAM 7 and no font cache memory cannot be reserved, the bit map pattern memory, filler pattern memory, outline pattern memory, and shadow pattern memory must be reserved in the built-in RAM. In this case, however, it is effective to commonly use the bit map pattern memory and the filler pattern memory. That is, only the information portion exists in the filler pattern memory and the head address of the bit map pattern information portion is stored in the pointer to the filler pattern information portion.

Consequently, the capacity of the RAM 7 can be saved.

What is claimed is:

1. A character pattern forming method comprising the steps of:

storing one basic pattern data corresponding to one character code;

designating a type of outline pattern and a type of shadow pattern;

forming an outline pattern in accordance with the designated type of outline pattern and a shadow pattern in accordance with the designated type of shadow pattern from the stored basic pattern data, wherein the outline pattern and the shadow pattern are formed in respective different processes;

individually storing each of the formed outline and shadow patterns; and controlling the output of a synthesized pattern by combining the stored outline and shadow patterns.

2. A method according to claim 1, wherein said method is carried out in a printer.

3. A method according to claim 1, wherein the controlling step further includes the step of controlling, in response to input of the output instruction, the output of either one of the stored outline and shadow patterns.

4. A method according to claim 1, wherein the output instruction is input from a host computer.

5. A method according to claim 1, wherein the designated type indicates a type of hatching pattern.

6. A method according to claim 1, wherein the designated type indicates color information.

7. A method according to claim 1, wherein said controlling step comprises outputting the synthesized pattern combined with a filler pattern.

8. A method according to claim 1, wherein said forming step comprises forming the pattern in response to a designated character size.

9. A method according to claim 1, wherein said forming step comprises forming the pattern in response to a designated outline thickness.

10. A method according to claim 1, wherein said forming step comprises forming the pattern in response to a designated shadow direction.

11. A method according to claim 1, wherein said forming step comprises forming the pattern in response to a designated shadow length.

12. A method according to claim 1, further comprises the step of storing the formed pattern in a font cache memory.

13. A method according to claim 1, wherein said controlling step comprises outputting the synthesized pattern as a bit map image.

14. A character pattern forming apparatus comprising:

storing means for storing one basic pattern data corresponding to one character code;

designating a type of outline pattern and a type of shadow pattern;

forming means for forming an outline pattern in accordance with the designated type of outline pattern and a shadow pattern in accordance with the designated type of shadow pattern from the stored basic pattern data, wherein the outline pattern and the shadow pattern are formed in respective different processes;

storing means for individually storing each of the formed outline and shadow patterns; and control means for controlling the output of a synthesized pattern by combining the stored outline and shadow patterns.

15. An apparatus according to claims 14, wherein the control means further includes the controlling, in response to input of the output instruction, the output of either one of the stored outline and shadow patterns.

16. An apparatus according to claim 14, wherein said apparatus is a printer.

17. An apparatus according to claim 14, wherein the output instruction is input from a host computer.

18. A method according to claims 14, wherein the designated type indicates a type of hatching pattern.

19. A method according to claim 14, wherein the designated type indicates color information.

20. An apparatus according to claim 14, wherein said control means outputs the synthesized pattern combined with a filler pattern.

21. An apparatus according to claim 14, wherein said forming means forms the pattern in response to a designated character size.

22. An apparatus according to claim 14, wherein said forming means forms the pattern in response to a designated outline thickness.

23. An apparatus according to claim 14, wherein said forming means forms the pattern in response to a designated shadow direction.

24. An apparatus according to claim 14, wherein said forming means forms the pattern in response to a designated shadow length.

25. An apparatus according to claims wherein said storing means comprises a font cache memory.

26. An apparatus according to claim 14, wherein said control means outputs the synthesized pattern as a bit map image.

27. A computer-readable memory medium storing computer-executable process steps to form a character pattern, the steps comprising:

a storing step to store one basic pattern data corresponding to one character code;

a designating step to designate a type of outline pattern and type of shadow pattern;

a forming step to form an outline pattern in accordance with the designated type of outline pattern and a shadow pattern in accordance with the designated type of shadow pattern from the stored basic pattern data, wherein the outline pattern and the shadow pattern are formed in respective different processes;

a storing step to individually store each of the formed outline and shadow patterns; and a controlling step to control the output of a synthesized pattern by combining the stored outline and shadow patterns.

28. A method according to claim 27, wherein said controlling step comprises outputting the synthesized pattern combined with a filler pattern.

29. A method according to claim 27, wherein said forming step comprises forming the pattern in response to a designated character size.

30. A method according to claim 27, wherein said forming step comprises forming the pattern in response to a designated outline thickness.

31. A method according to claim 27, wherein said forming step comprises forming the pattern in response to a designated shadow direction.

32. A method according to claim 27, wherein said forming step comprises forming the pattern in response to a designated shadow length.

33. A method according to claim 27, further comprises the step of storing the formed pattern in a font cache memory.

34. A method according to claim 27, wherein said controlling step comprises outputting the synthesized pattern as a bit map image.

* * * * *

UNITED STATES PATENT AND TRADEMARK OFFICE
CERTIFICATE OF CORRECTION

PATENT NO. : 5,808,600

DATED : September 15, 1998

INVENTOR : Yasushi Mochizuki

Page 1 of 2

It is certified that error appears in the above-identified patent and that said Letters Patent is hereby corrected as shown below:

COVER PAGE

Under [56] References Cited, U.S. Patent Documents, please insert the following:

--4,979,130    12/18/90    Li et al.--; and

Under [56] References Cited, Foreign Patent Documents, please insert the following:

--  0385269    9/5/90      Europe
    2183428    6/3/87      United Kingdom
    2588398    10/15/87    France
    63-286352  11/24/88    Japan
    1-255887   10/12/89    Japan --.

UNITED STATES PATENT AND TRADEMARK OFFICE
CERTIFICATE OF CORRECTION

PATENT NO. : 5,808,600

DATED : September 15, 1998

INVENTOR : Yasushi Mochizuki

It is certified that error appears in the above-identified patent and that said Letters Patent is hereby corrected as shown below:

<u>COLUMN 6</u>

Line 22, "claims" should read --Claim 14,--.

Signed and Sealed this

Seventh Day of March, 2000

Attest:

*Attesting Officer*

Q. TODD DICKINSON

*Commissioner of Patents and Trademarks*